United States Patent
Di Martino

(10) Patent No.: US 8,069,744 B2
(45) Date of Patent: Dec. 6, 2011

(54) DEVICE FOR SYNCHRONIZATION AND ENGAGEMENT OF A GEAR TRANSMISSION OF A MOTOR VEHICLE

(75) Inventor: Alessandro Di Martino, Pomigliano D'Arco (IT)

(73) Assignee: Elasis-Societa Consortile per Azioni, Pomigliano D'Arco (IT)

( * ) Notice: Subject to any disclaimer, the term of this patent is extended or adjusted under 35 U.S.C. 154(b) by 627 days.

(21) Appl. No.: 12/224,465

(22) PCT Filed: Mar. 1, 2007

(86) PCT No.: PCT/EP2007/051968
§ 371 (c)(1),
(2), (4) Date: Dec. 18, 2008

(87) PCT Pub. No.: WO2007/099153
PCT Pub. Date: Sep. 7, 2007

(65) Prior Publication Data
US 2009/0277293 A1    Nov. 12, 2009

(30) Foreign Application Priority Data
Mar. 2, 2006    (EP) .................................. 06425138

(51) Int. Cl.
*F16H 3/38*    (2006.01)
*F16D 11/00*   (2006.01)

(52) U.S. Cl. ........................ 74/339; 192/53.35

(58) Field of Classification Search .............. 74/339, 74/333, 473.36; 192/53.35
See application file for complete search history.

(56) References Cited

U.S. PATENT DOCUMENTS

| | | | | |
|---|---|---|---|---|
| 3,692,163 A | * | 9/1972 | Ruettinger | 192/53.331 |
| 4,782,929 A | * | 11/1988 | Muller | 192/53.35 |
| RE35,796 E | * | 5/1998 | Olson | 192/53.31 |
| 5,937,982 A | * | 8/1999 | Olson et al. | 192/53.31 |
| 5,957,257 A | * | 9/1999 | Nellums | 192/53.31 |
| 6,364,083 B1 | * | 4/2002 | Gluys et al. | 192/53.31 |
| 6,419,063 B1 | * | 7/2002 | Smith | 192/53.31 |
| 6,883,395 B2 | | 4/2005 | Lanz | 74/335 |
| 6,993,991 B2 | | 2/2006 | Baasch et al. | 74/355 |

FOREIGN PATENT DOCUMENTS

BE        657127        1/1965

(Continued)

OTHER PUBLICATIONS

International Search Report dated Apr. 2, 2007 from PCT/EP2007/051968.

*Primary Examiner* — Roger Pang
(74) *Attorney, Agent, or Firm* — Ohlandt, Greeley, Ruggiero & Perle, L.L.P.

(57) ABSTRACT

A synchronization and engagement device for a gear transmission of a motor vehicle is provided with: a cylindrical hollow portion, which is fixed and coaxial with respect to a shaft of the gear transmission; a toothed driving ring, fixed to an idle or neutral gear of the gear transmission; a first conical friction surface, carried by one between the driving ring and the gear; a floating toothed synchronizing ring, which has a second conical friction surface mating with the first conical surface; and at least one engagement member, which is angularly fixed with respect to the cylindrical hollow portion, is able to slide axially under the action of a control device, and has a cylindrical toothing, designed to render the cylindrical hollow portion angularly fixed with respect to the driving ring. The engagement member is located in a radial position that is more internal with respect to the conical friction surfaces, whilst the cylindrical toothing of the engagement member is an external toothing.

21 Claims, 8 Drawing Sheets

FOREIGN PATENT DOCUMENTS

| | | |
|---|---|---|
| DE | 318115 | 1/1920 |
| DE | 43 25 964 A1 | 1/1995 |
| DE | 43 24 264 C1 | 3/1995 |
| DE | 102 06 584 A1 | 9/2003 |
| FR | 2862366 | 11/2003 |
| WO | WO 2005/036007 | 4/2005 |

* cited by examiner ns

Figure 7:
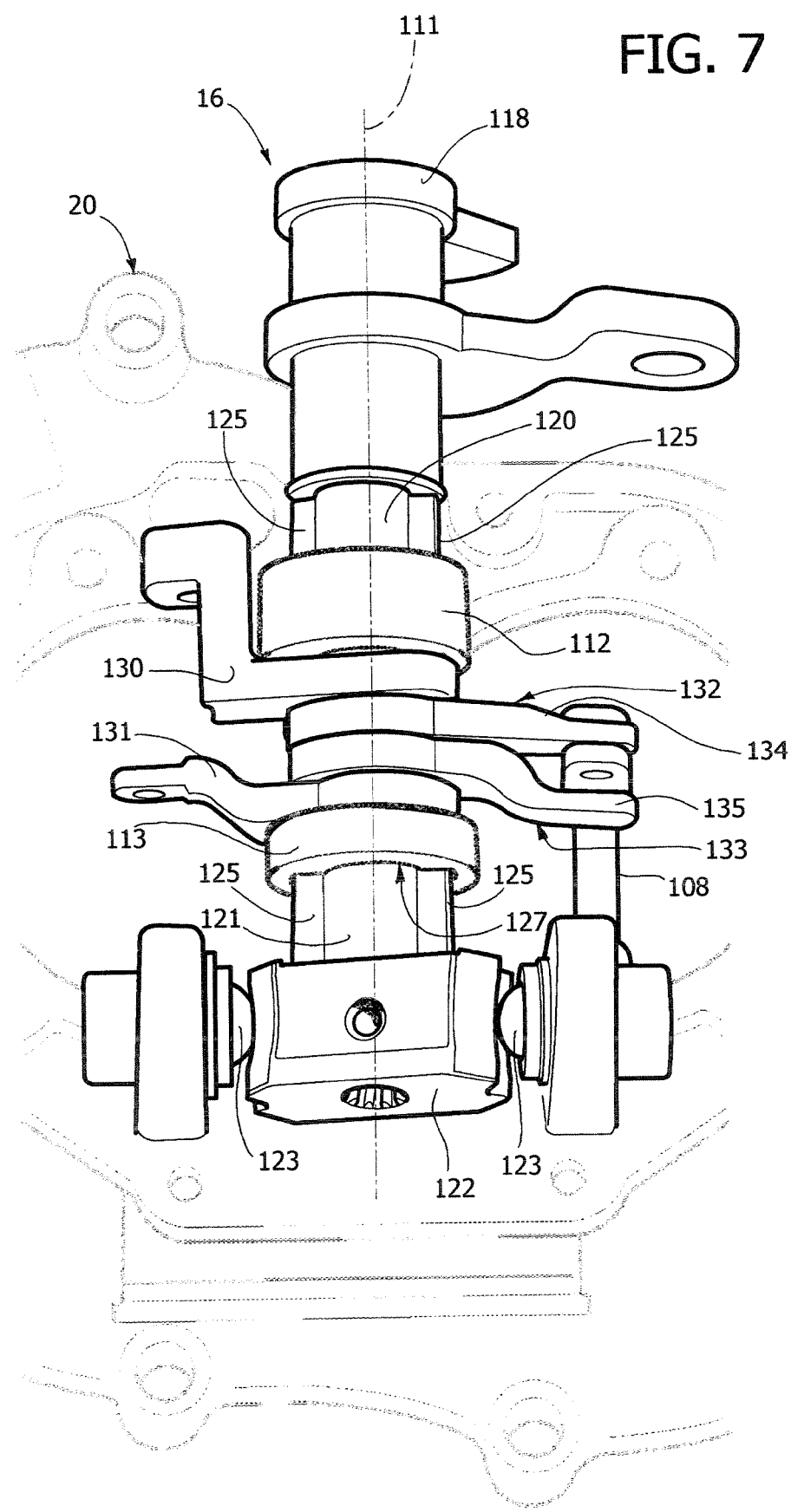
Figure 8:
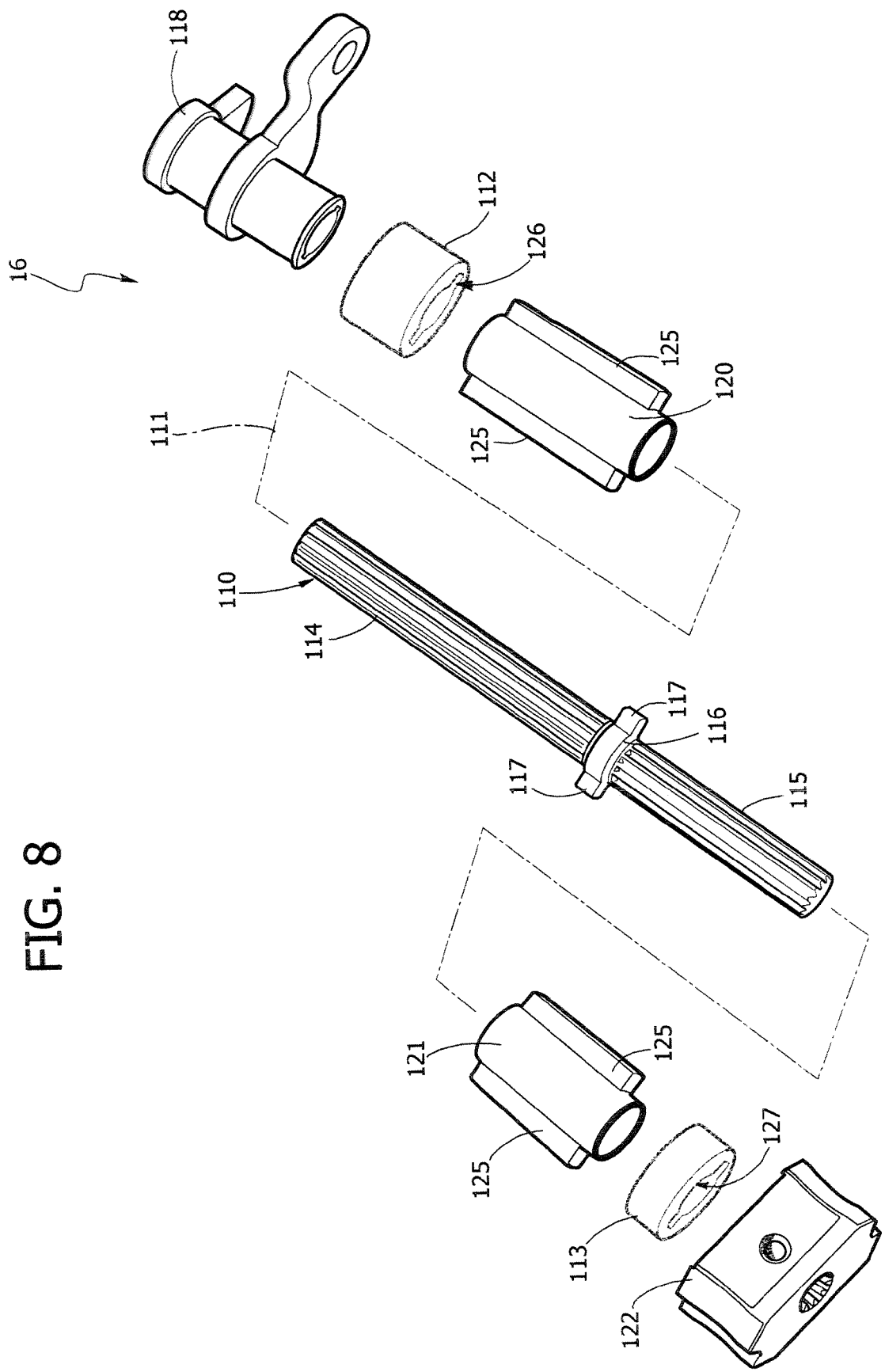

DEVICE FOR SYNCHRONIZATION AND ENGAGEMENT OF A GEAR TRANSMISSION OF A MOTOR VEHICLE

TECHNICAL FIELD

The present invention relates to a synchronizing device for a gear transmission of a motor vehicle.

BACKGROUND ART

As is known, the configurations of an automobile gear transmission are characterized by rather consolidated schemes, which envisage use of: a primary shaft, on which the driving gears are fitted, either idle or fixed; a secondary shaft, on which the driven gears are fitted, again either idle or fixed; a mechanism for synchronization and engagement between the idle gears and the shaft on which these are fitted; a pair of gears for final reduction of the transmission ratio at output from the secondary shaft; and, finally, a differential, which supplies the final output of the motion to two axle shafts.

The above arrangement is accompanied by a control device, which constitutes an interface between the driver and the synchronization and engagement mechanism. In particular, the transmission ratios or gears are engaged selectively by operating a gear lever in the passenger compartment. Said lever actuates a finger-shaped control member, which in turn actuates a series of gearshift forks, which are movable in a direction parallel to the axes of the primary and secondary shafts. The gearshift forks are arranged on the outside of said shafts, correspond to respective ranges of the gears (for example, the range of the first and second gears, the range of the third and fourth gears, and the range of the fifth and reverse gears), and are associated to respective parallel control seats facing one another, engaged by the finger member. The finger member is movable along a selection path that freely traverses the control seats for selecting one of said control seats and, hence, a range of the gears (first and second, or else third and fourth, or else fifth and reverse) and along an engagement path parallel to the planes of lie of the control seats for displacing the seat selected and engaging one of the two gears of the corresponding range, said finger member shifting in opposite directions starting from a central position, to which there corresponds an idle or "neutral" condition. In general, one of the two paths of the finger member is rectilinear, whilst the other is defined by a rotation.

In known solutions, each gearshift fork engages a corresponding sleeve of the synchronization and engagement mechanism. For each pair of idle gears associated to the same range and fitted on the same shaft (whether primary or secondary), the synchronization and engagement mechanism is normally provided with: a hub fitted externally on the shaft; a pair of driving rings arranged on opposite axial sides of the hub, each of which is angularly fixed with respect to a corresponding gear and which have respective external toothings; and a pair of rings for synchronizing the motion that are able to activate the driving rings selectively.

The synchronizing rings are each set axially between the hub and the corresponding driving ring, have respective conical friction surfaces designed to co-operate, in use, with corresponding conjugated friction surfaces carried by the driving rings, and are provided with respective external toothings.

The sleeve is located on the outside of the hub and is rendered angularly fixed with respect to the hub itself by means of an internal toothing of its own. The sleeve can slide axially on opposite sides of the hub under the action of the corresponding gearshift fork. During the axial travel of the sleeve in one direction or else in the other, the internal toothing of the sleeve engages first the external toothing of the synchronizing ring and then the external toothing of the driving ring, when the relative speed of the latter with respect to the synchronizing ring goes to zero as a result of the contact between the respective conjugated friction surfaces.

The synchronization and engagement mechanism just described, albeit satisfactory from the functional standpoint, as a whole requires a space that is relatively large, in particular in a direction parallel to the axes of the primary and secondary shafts.

Indeed, the engagement between the sleeve and the gearshift fork, and the travel of the sleeve itself in opposite directions with respect to the central idle position impose the need for a minimum axial distance that is relatively large between the two gears associated to the same range.

Another solution is disclosed in WO2005/036007A1, where a sliding sleeve is rotationally fixed between two gear wheels so that it can be displaced axially on a gearbox shaft. Said gearbox shaft is configured as a hollow shaft. A gearshift rod is mounted in the gearbox shaft so that it can be axially displaced. The axial shift displacements of the gearshift rod are transmitted to the sliding sleeve by means of radial connection elements. Synchronisation rings are located between the sliding sleeve and the gear wheels in order to adapt the speeds of the sliding sleeve and the gear wheel that is to be shifted to one another during the shift operation.

Also this solution requires a space that is relatively large.

DISCLOSURE OF INVENTION

The aim of the present invention is to provide a device for synchronization and engagement of a gear transmission of a motor vehicle which will enable a simple and inexpensive solution to the problems set forth above and at the same time is preferably simple to produce and to install.

According to the present invention, a device for synchronization and engagement of a gear transmission of a motor vehicle is provided, as defined in claim 1.

BRIEF DESCRIPTION OF THE DRAWINGS

For a better understanding of the present invention a preferred embodiment thereof is now described, purely by way of non-limiting example, with reference to the annexed plate of drawings, wherein:

FIG. 1 is a cross section, with parts removed for reasons of clarity, of a gear transmission provided with a preferred embodiment of the synchronization and engagement device according to the present invention;

FIG. 2 shows at an enlarged scale, with parts in cross-sectional view and with parts removed for reasons of clarity, the synchronization and engagement device shown in FIG. 1, at the end of an engagement manoeuvre;

FIG. 3 is a perspective view of the synchronization and engagement device shown in FIG. 2, sectioned with a different plane of cross section and set in an idle condition;

FIG. 4 shows in exploded view some components of the synchronization and engagement device shown in FIGS. 2 and 3;

FIG. 5 is similar to FIG. 1 and schematically shows a variant of the device shown in FIG. 1;

FIG. 6 schematically shows the gear lever of the gear transmission of FIG. 1;

FIG. 7 is a front view, at an enlarged scale and with parts removed for reasons of clarity, of a device for controlling the synchronization and engagement device shown in FIG. 1; and FIG. 8 is an exploded perspective view of some components shown in FIG. 7.

BEST MODE FOR CARRYING OUT THE INVENTION

Figure 1:
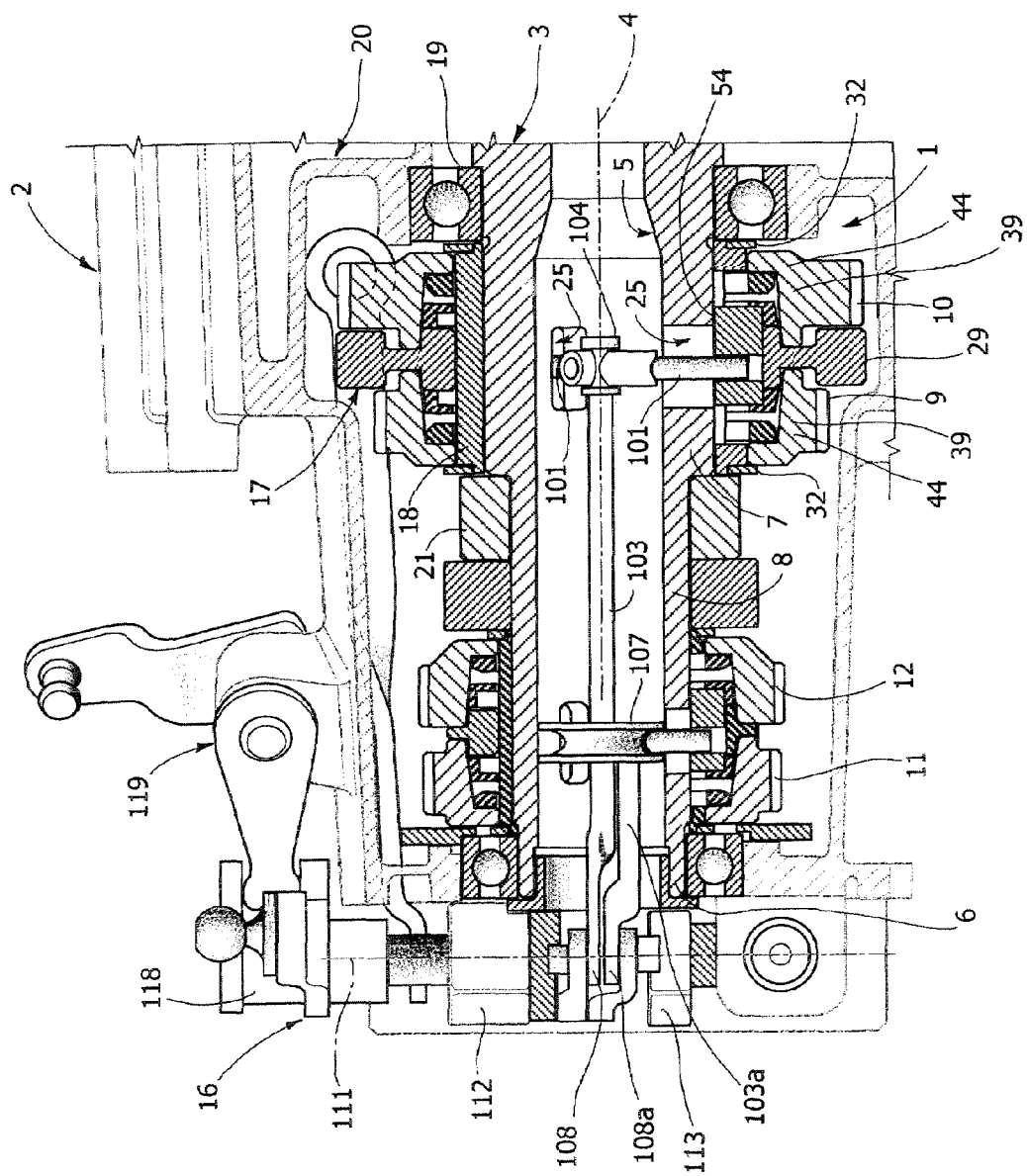

In FIG. 1, the reference number 1 designates a synchronization and engagement device, forming part of a gear transmission 2 (partially shown) for a motor vehicle (not shown).

The gear transmission 2 comprises two or three transmission shafts that are parallel to one another, of which one is the primary driving shaft. FIG. 1 shows partially just one of said shafts, designated by the reference number 3. The shaft 3 has an axis designated by 4, is axially hollow, i.e., has a cavity 5 that gives out at one end 6 through an opening, and comprises two intermediate portions 7 and 8, which carry respective pairs of gears, designated, respectively, by 9, 10 and by 11, 12.

Figure 6:
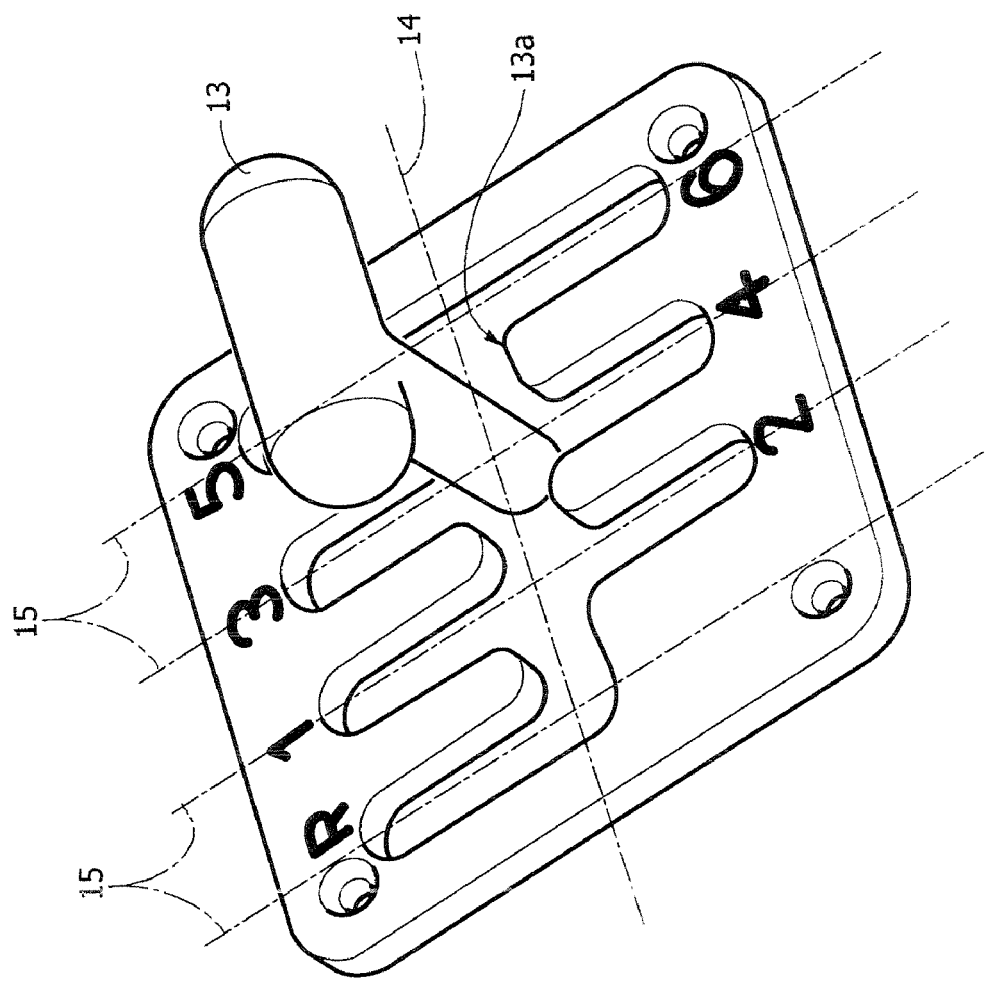

The gears 9-12 are angularly idle and axially fixed with respect to the shaft 3 and mesh permanently with respective gears (not shown) fitted on another shaft of the gear transmission 2. Each pair of idle gears is associated to a corresponding range of gears, which is activated by the driver of the motor vehicle by operating a control grip 13, for example, the gear lever that is shown in FIG. 6 and that is movable in a grid 13a of seats. Via said grip 13 it is possible to select the different ranges of the gears, i.e., the range of the first and second gears, the range of the third and fourth gears, the range of the fifth and sixth gears, and the range of the reverse gear, by shifting the grip 13 in the grid 13a along a transverse selection path 14 and keeping in any case the gear transmission 2 in a neutral condition, and it is possible to engage, for the range selected, the two corresponding gears, shifting the grip 13 in the grid 13a along a longitudinal engagement path 15 starting from a central position in one direction or, respectively, in the opposite one.

Once again with reference to FIG. 1, the grip 13 actuates the device 1 via a control device 16, which will be described in greater detail hereinafter. The following description refers to the part of the device 1 that is associated to the pair of gears 9 and 10, it being understood that the remaining part associated to the other ranges is analogous.

The device 1 comprises a hub 17, which is fixed and coaxial with respect to the shaft 3 and comprises, in turn, an internal bushing 18, which is fitted on the portion 7 in a fixed angular position, for example via a grooved coupling (not shown), and is withheld axially, on one side, by the internal ring of a bearing 19, which keeps the shaft 3 coupled, so that it can turn axially, to a supporting structure 20 obtained via casting, and on the other side by a locator spacer ring 21 fitted in a fixed axial position on the shaft 3.

Figure 2:
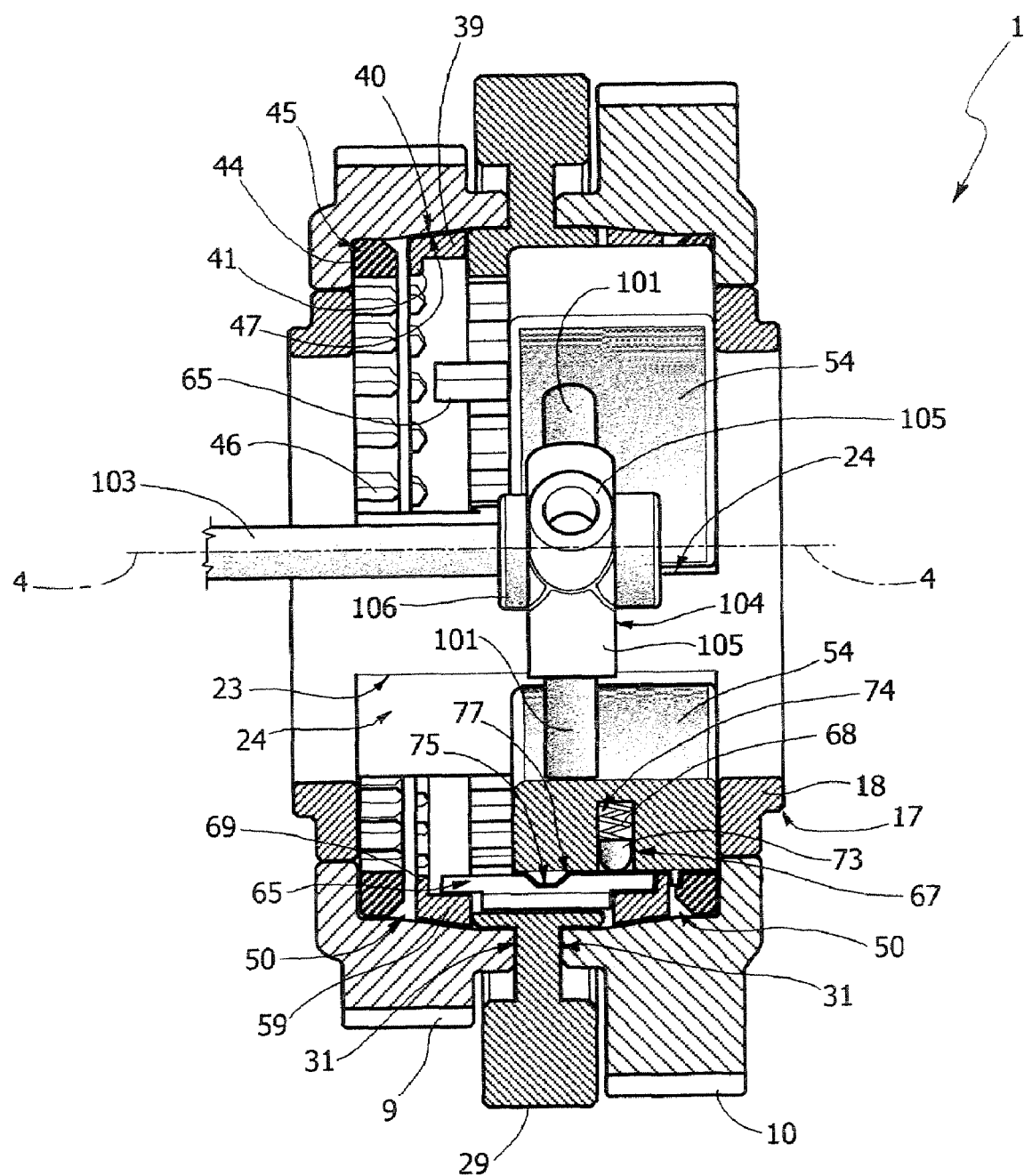
Figure 3:
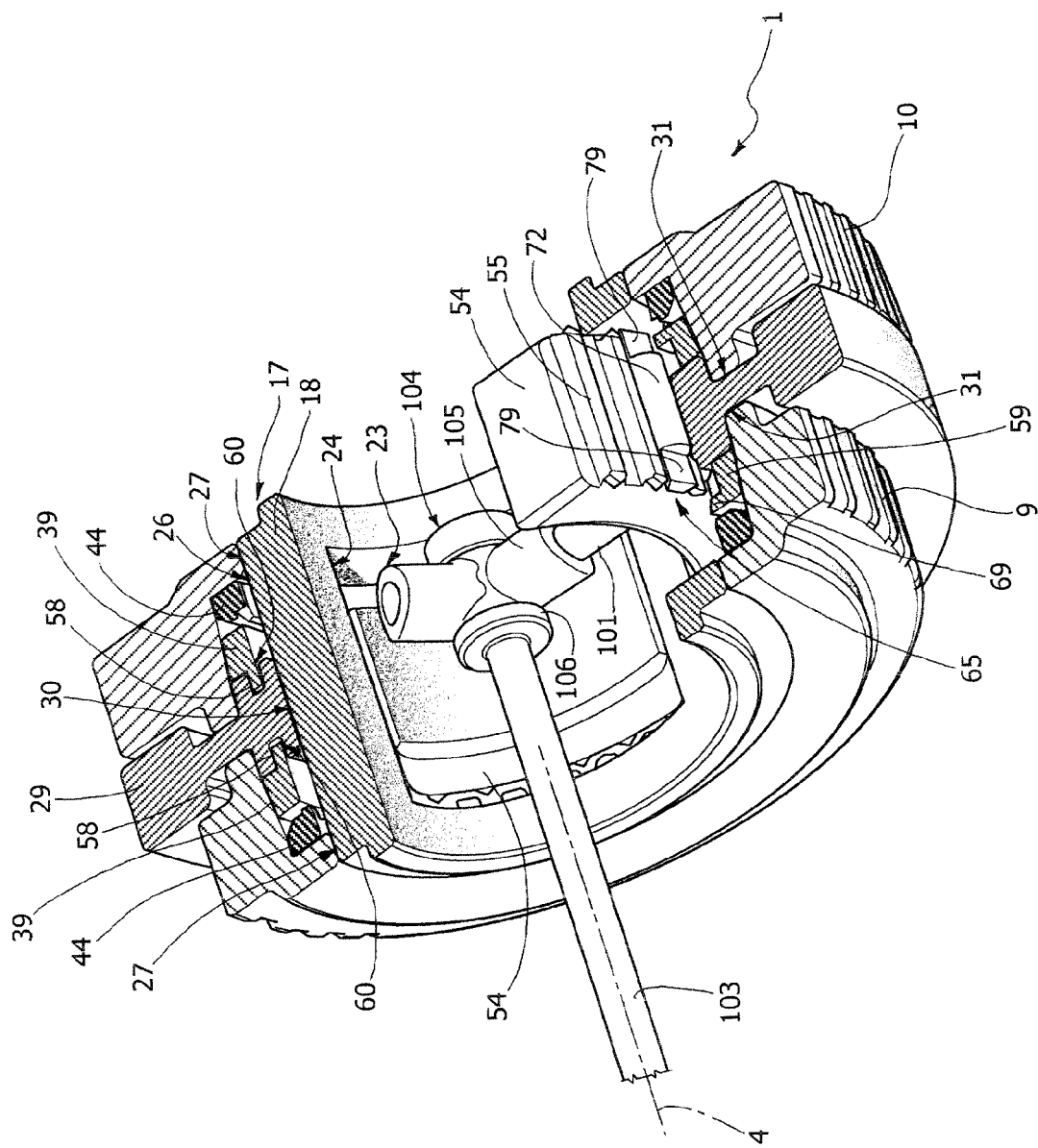

According to what is shown in FIGS. 2 and 3, the bushing 18 has three seats 23, which are arranged at 120° apart from one another about the axis 4, have the shape of a cylindrical sector, pass in a radial direction through the bushing 18, and have respective pairs of plane axial-guide surfaces 24 facing one another in a circumferential direction. In a position corresponding to the seats 23, the shaft 3 has respective through slots 25, which are made in a radial direction and are axially elongated (FIG. 1).

The bushing 18 has an external cylindrical surface 26 (FIG. 3) comprising two terminal areas 27, on which there are coupled idle and sliding the internal cylindrical surfaces of the gears 9 and 10, respectively.

The hub 17 further comprises an external ring gear 29, which is coupled in a fixed and coaxial position on a central area 30 of the surface 26 (FIG. 3) in a way not described in detail, for example by means of welding, and defines a spacer between the gears 9 and 10. In particular, each gear 9, 10 is sandwiched in an axial direction between a corresponding face 31 of the ring gear 29 and a corresponding ring 32 fitted on the axial end of the bushing 18 (FIG. 1).

Once again with reference to FIGS. 2 and 3, the device 1 further comprises two floating synchronizing rings 39, which are arranged on axially opposite sides of the ring gear 29 and are each provided with a conical friction surface 40 (FIG. 2) facing radially outwards, and a toothing 41 facing radially inwards.

The device 1 further comprises two driving rings or flanges 44 coaxial to the bushing 18, each of which is located between a corresponding ring 39 and a corresponding gear 9, 10 and is fixed with respect to the latter. In particular, each ring 44 is welded to an internal surface 45 of the corresponding gear 9, 10 and has a toothing 46 facing radially inwards. The surface 45 of each gear 9, 10 comprises a conical friction area 47 (FIG. 2), which is located in an intermediate position between the ring gear 29 and the corresponding ring 44, mates with surface 40 of the corresponding ring 39, and co-operates, in use, with said surface 40.

In particular, for each gear 9, 10, the surface 45, the bushing 18, and the face 31 of the ring gear 29 define an annular chamber 50 housing the rings 44 and 39.

The device 1 then comprises three engagement members 54, which are angularly located at equal distances apart about the axis 4, are completely housed, each, in a corresponding seat 23, have the shape of a cylindrical sector, are coupled to the surfaces 24 so as to receive or transmit a torque with respect to the bushing 18, and are able to slide jointly with one another under the control of the device 16 and under the guidance of the surfaces 24 so as to translate axially between a central idle, or neutral, position, in which they leave the gears 9, 10 idle, and two opposite lateral end-of-travel engagement positions, in which they render the shaft 3 angularly fixed with respect to the gear 9 or 10 selectively.

In particular, the members or sectors 54 have a cylindrical toothing 55 (FIG. 3), which faces radially outwards and meshes progressively with the toothing 41 and hence with the toothing 46 during translation from the central idle position towards any one of the lateral end-of-travel engagement positions, thus rendering the bushing 18 angularly fixed with respect to the ring 44 and engaging the corresponding gear.

Figure 4:
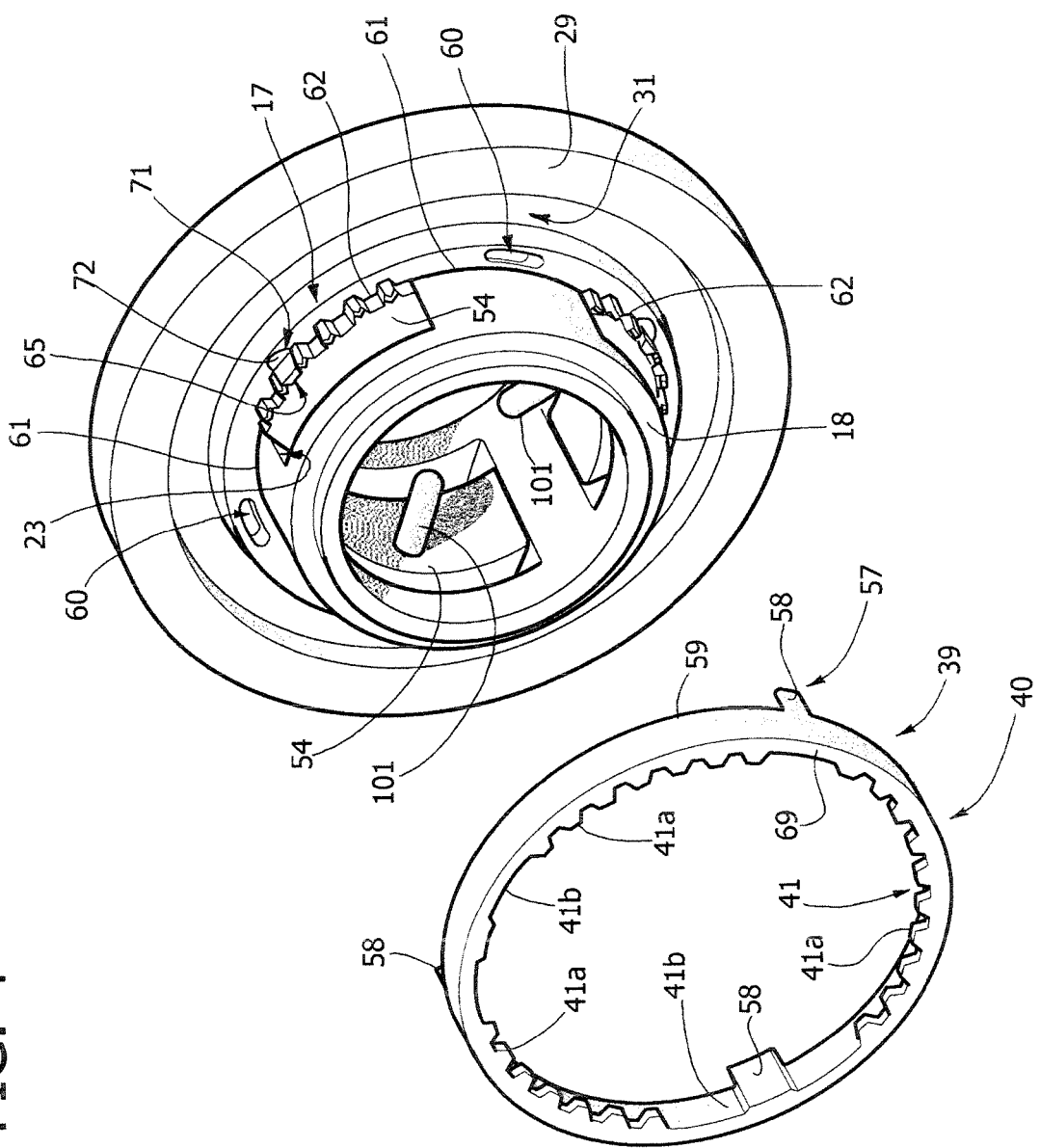

With reference to FIG. 4, for each gear 9, 10, a device 57 of angular constraint is located axially between the face 31 and the ring 39 for limiting the angular fluctuation of the ring 39 with respect to the sectors 54. The device 57 comprises three axial teeth 58, which are fixed to an annular portion 59 of the ring 39 and are angularly located at a distance apart from one another, and three retention seats 60, which are made on the face 31 and each of which is engaged by a corresponding tooth 58 in a slidable way in a circumferential direction. The seats 60 have in a circumferential direction a dimension greater than that of the teeth 58 to enable a play equal to half the pitch of the toothing 41.

The internal radial surface of the ring gear 29 comprises three cylindrical portions 61 and three toothed portions 62 angularly alternating with one another about the axis 4. The portions 61 are coupled to the central area 30 of the surface 26, whilst the portions 62 are engaged by the toothing 55 of the respective sectors 54 in an axially slidable way.

With reference to FIGS. 2 and 4, the device 1 comprises three pre-synchronization small blocks 65, which axially face the rings 39, are coupled in an axially slidable and angularly fixed way to the sectors 54 and are coupled to the sectors 54 themselves by interposition of a retention device 67.

The device 67 comprises, for each small block 65, a corresponding spring 68 that keeps the small block 65 itself in a position axially fixed with respect to the corresponding sector 54 during a first portion of axial travel made by the sector 54 itself starting from the central idle position, referred to as pre-synchronization travel. In said first portion of travel, the small block 65 pushes an annular portion 69 of the ring 39 axially under the driving action exerted by the radial thrust of the spring 68 in order to bring the conical surface 40 to engage with the surface 47. The device 68 is releasable when the axial travel of the sector 54 continues further towards the lateral end-of-travel engagement position.

In particular, each small block 65 is located radially between a corresponding sector 54 and a corresponding toothed portion 62 of the ring gear 29, whilst the latter has three axial through grooves 71 (FIG. 4), which axially guide respective portions 72 of the small blocks 65. The device 68 comprises, for each small block 65, a corresponding pin 73, which can slide radially in a guide cavity 74 made in the corresponding sector 54. The spring 68 is housed in the cavity 74 and pushes the tip of the pin 73 to engage in an axial retention seat 75 made in the small block 65. At the end of the pre-synchronization-travel, the small block 65 can no longer advance on account of the axial contrast surface, defined by the portion 69, having become fixed, so that the external tip of the pin 73 tends to follow a terminal ramp 77 of the seat 75 to exit progressively from the seat 75 itself, receding radially in the cavity 74 against the elastic action of the device 68. The seat 75 is symmetrical, i.e., it has two ramps 77 opposite to one another for operation in regard to the gears 9 and 10, respectively.

Preferably, according to what is shown in FIG. 3, the small blocks 65 have an axial length equal to that of the sectors 54, and each comprise two ends 79 arranged on opposite sides of the portion 72, which in turn projects radially outwards with respect to the ends 79 and has an axial length equal to that of the groove 71. At the same time, for each ring 39, the portion 59 surrounds an end 79 of the small blocks 65 and axially faces the portions 72, whilst the portion 69 is set alongside the portion 59 and carries the toothing 41.

The toothing 41 is discontinuous, i.e., it is made up of three toothed portions 41a, which alternate with three edges 41b without toothing and are arranged in a position corresponding to the toothings 55 of the sectors 54.

As regards the simultaneous axial driving of the sectors 54 and engagement of the gears 9 and 10, with reference to FIGS. 1 and 3, three control pins 101 are arranged at 120° apart about the axis 4, engage at one end thereof respective radial seats, each made in a corresponding sector 54, are thus fixed with respect to the sectors 54 and with respect to the shaft 3, and extend radially inwards starting from the sectors 54 themselves through the slots 25. The slots 25 have dimensions such as to enable axial translation of the respective pins 101 between the central idle position and the lateral end-of-travel engagement positions.

The device 16 comprises a control stem 103, which is coupled to the pins 101 via a cross journal 104, is housed in the cavity 5 of the shaft 3, and extends along the axis 4. The cross journal 104 comprises three radial arms 105 having respective seats engaged by the internal ends of the pins 101, in a fixed position, and a central portion 106 (FIG. 3) coupled to one end of the stem 103 by means of a bearing (not shown), in particular a contact bearing.

As regards, instead, engagement of the gears 11 and 12, a stem 103a is provided in a direction parallel to, and located at a distance from, the axis 4 and, hence, the stem 103. The control pins provided for engagement of the gears 11 and 12 are carried in a fixed position by a supporting ring 107, which is traversed with play by the stem 103 and has a circular track coupled to one end of the stem 103a by means of a bearing (not shown), in particular a contact bearing.

The stems 103, 103a extend outside of the cavity 5 on the side of the end 6, where they have respective terminal portions 108, 108a external to the shaft 3 and actuated for causing translation of the stems 103, 103a themselves in a direction parallel to the axis 4 under the control transmitted mechanically starting from the grip 13.

With reference to FIGS. 7 and 8, the device 16 comprises a control shaft 110, which has an axis 111 orthogonal and skew with respect to the axis 3, is located partly in a position facing the end 6 of the shaft 3 and in an intermediate position between the axis 4 and the axis of another shaft of the gear transmission 2, and is supported by the structure 20 via two fixed portions 112, 113 axially fixed and located at a distance from one another.

The shaft 110 comprises a top terminal axial portion 114 and a bottom terminal axial portion 115, which are provided, on the external side surface thereof, with respective knurlings or groovings. The shaft 110 further comprises an intermediate portion 116, which brings into a fixed position two fingers 117, which are diametrically opposite to one another and project radially with respect to the axial portions 114, 115.

A lever member 118 is fitted in a fixed position on the end of the axial portion 114 and is coupled to the grip 13 by means of a lever transmission 119 (partially shown and not described in detail), which is able to bestow upon the shaft 110 a motion of selection of the ranges, in translation along the axis 111, and a motion of engagement of the gears, in rotation about the axis 111 in opposite directions starting from a central reference position corresponding to the idle or neutral condition of the gear transmission 2.

The device 16 further comprises two sleeves 120, 121, which are arranged on opposite axial sides of the portion 116 and are fitted on the axial portion 114 and 115, respectively, in an angularly idle and axially fixed position. In particular, the sleeve 120 is gripped axially between the member 118 and the portion 116, whilst the sleeve 121 is gripped between the portion 116 and a positioning member 122.

The member 122 is fitted in a fixed position on the end of the axial portion 115 and co-operates (in a way not described in detail) with two spherical elements 123 loaded by respective springs (not shown) and carried by the structure 20, to bring the shaft 110 angularly always back into a central idle position and axially into a central reference position when the gears are disengaged and the action of manual control on the grip 13 ceases.

The sleeves 120, 121 each carry, in a fixed position, a corresponding pair of radial appendages 125, which are diametrically opposite to one another, are elongated in a direction parallel to the axis 111, and, when the shaft 110 is in its central idle position, are aligned to the fingers 117. The sleeves 120, 121 engage in an angularly fixed and axially slidable way respective fixed guide seats 126, 127, which are made in the portions 112 and 113, respectively, and are complementary to the shape of the appendages 125 for guiding the sleeves 120, 121 themselves, and, hence, the shaft 110, along the axis 111.

The device 16 further comprises four levers 130, 131, 132, 133, which are axially packed tight between the portions 112 and 113, are hence fixed along the axis 111, are fitted on the sleeves 120, 121 and on the portion 116, each has an axial height substantially equal to that of the fingers 117, and are each associated to a corresponding range of gears.

The levers 130-133 are constrained angularly to the appendages 125 of the sleeves 120, 121 or else to the fingers 117 of the portion 116. As will be described more fully hereinafter, just one of the levers 130-133 is selectively coupled to the fingers 117 to turn together with the shaft 110 about the axis 111. The levers 130-133 comprise respective radial plate-like arms, the ends of which are coupled to the ends of respective control stems, part of which are housed in the shafts of the gear transmission 2.

In particular, the levers 132, 133 comprise respective radial arms 134, 135, which are hinged at their own ends to the portions 108 and 108a, respectively, of the stems 103, 103a, with axes of articulation parallel to the axis 111.

During the motion of selection of the shaft 110 in axial translation, the fingers 117 translate axially and come to engage in any one of the levers 130-133, whilst the other levers remain coupled to the appendages 125. In other words, during displacement of the grip 13 along the path 14, the shaft 110 translates axially so as to select one of the levers and, hence, one of the ranges.

When the grip 13 is shifted along the longitudinal engagement path 15, the shaft 110 moves with motion of engagement in rotation. The fingers 117 cause rotation about the axis 111 just of the lever selected, whilst the sleeves 120, 121, and hence the other levers, remain in a fixed angular position with respect to the structure 20.

On account of the circular path of the hinging points between the ends of the arms 134, 135 and the portions 108, 108a of the stems 103, 103a, the latter have an oscillation in the planes of lie of the respective levers 132, 133 (orthogonal to the axis 11) during the motion of engagement: for example, said oscillation is compensated by the internal play of the contact bearings present in the cross journal 104 and in the ring 107.

An axial translation of the stem 103 starting from the central idle position causes simultaneous displacement of the three sectors 54 towards the lateral end-of-travel engagement position that has been set, for example towards the gear 9. The sectors 54 in the first portion of travel (of pre-synchronization) draw along with them the three small blocks 65, thanks to the elastic action of the device 68. When the surfaces 40, 47 come to engage with one another under the axial thrust of the small blocks 65, the gear 9 substantially assumes the same speed of rotation as the ring 39, and hence as the shaft 3, given that the ring 39 is driven in rotation by the device 57 in this step.

Continuing the axial travel of the sectors 54, the pins 73 disengage from the respective seats 75, whilst the toothing 55 of the sectors 54 starts to mesh with the toothing 41 of the ring 39. During this meshing step, the toothing 41 is aligned progressively with the toothing 55 rotating in a circumferential direction, thanks to an appropriate front profile of the teeth, in itself known and not described in detail, and hence recovers the play of half a pitch defined by the device 57.

Then, in the final part of the travel of the sectors 54, the toothing 46 comes to mesh also with the toothing 55 and is aligned progressively with the toothing 55 itself, thanks to an appropriate front profile of the teeth, in itself known and not described in detail.

Obviously, disengagement is caused by an axial movement of the stem 103 and hence of the sectors 54 in an opposite direction to disengage the toothing 55 of the sectors 65 progressively from the toothings 46 and 41.

Figure 5:
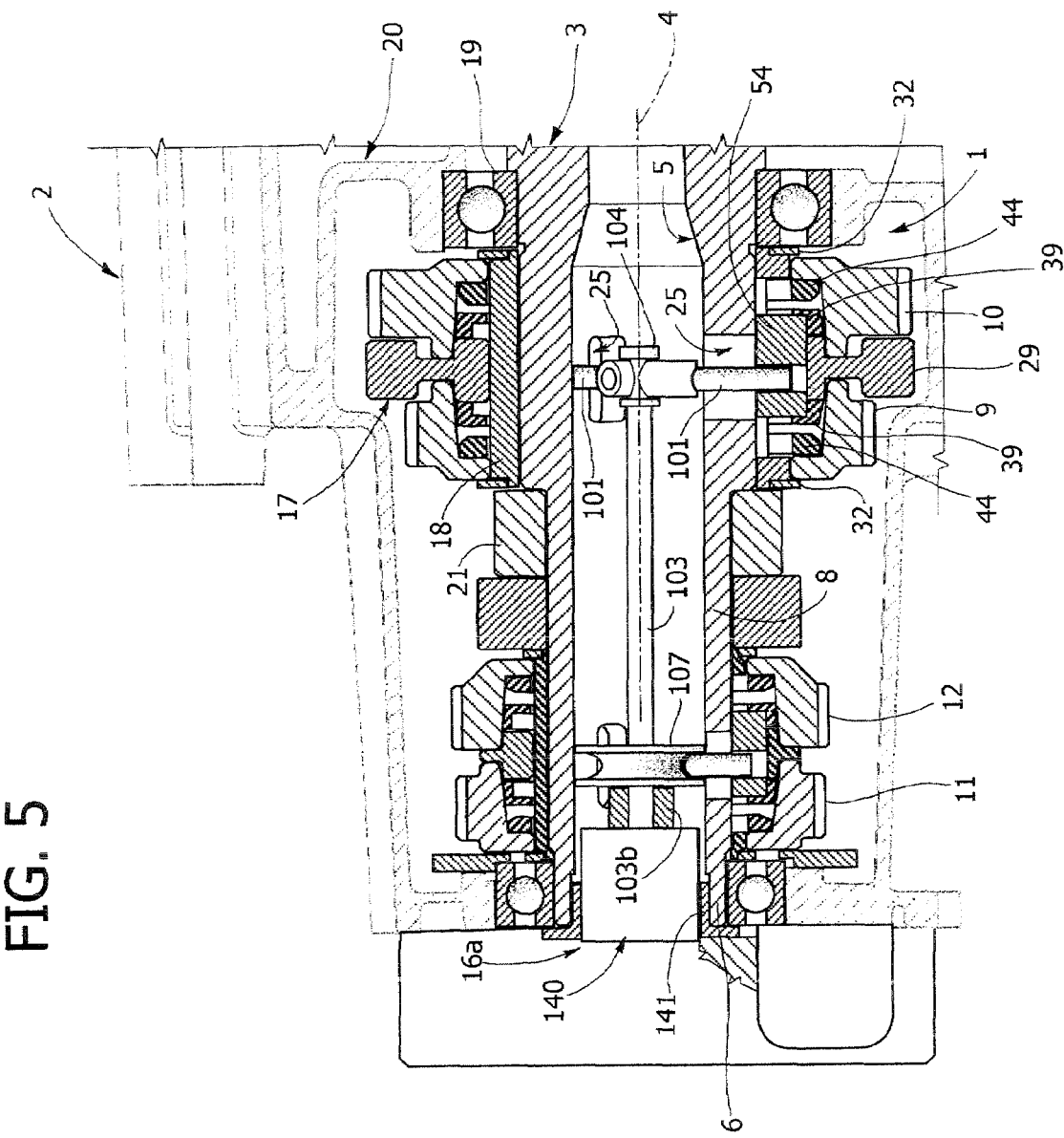

Provided in the variant shown in FIG. 5 is an automated control device 16a, instead of the device 16. In other words, for selection and engagement of the gears, the device 16a comprises one or more electrically, pneumatically or hydraulically governed actuators, which are controlled by electrical signals set by actuating the grip 13 or other equivalent control member.

In particular, for selection and engagement of the gears corresponding to the gears 9-12, the device 16a comprises a double-acting linear actuator 140 (shown schematically), comprising a sleeve or liner 141 housed at least partially in the cavity 5 and fixed to the structure 20, and two internal pistons (not shown), which are movable axially independently of one another and are fixed to the stem 103 and, respectively, to a stem 103b. The stem 103b replaces the stem 103a, is coaxial to the stem 103, is axially hollow, and is slidably engaged by the stem 103 itself.

The advantages of the present device 1 are described in what follows. The fact that at least one portion of the engagement members 54 (actuated by the device 16, 16a) is located in a radial position that is more internal with respect to the conical surfaces 40, 47 and to the toothings 41, 46 enables limitation, in a radial direction, of the overall dimensions on the outside of the ring gear 29 and, in an axial direction, of the dimension of the ring gear 29 itself. Indeed, the fact of envisaging a control of said members 54 within the shaft 3 enables elimination of the encumbrance which, instead, is necessary in the known solutions that envisage the use of gearshift forks in a position outside the shafts, in particular encumbrance due to need to engage the gearshift forks themselves to the engagement sleeves.

As is evident from the figures, the fact of having available the sectors 54 completely in a radial position that is more internal with respect to the conical surfaces 40, 47 and to the toothings 41, 46 (which are internal toothings, whilst the toothing 55 is an external toothing) enables elimination of any axially movable portion on the outside of the gears 9, 10 or in a position set alongside the toothings of the gears 9 and 10, and hence reduction of the axial distance between the gears 9, 10 themselves with respect to the known solutions, in which an external sliding sleeve is provided. In other words, it is possible to enable sliding of the members 54 directly in internal chambers 50 made in the gears 9, 10 and/or in a position that is radially more internal with respect to that of the gears 9, 10.

The constructional characteristics of the device 1 described above then enable a solution that is balanced from the standpoint of transmission of engagement forces and of the torque, and have a relatively small number of components and above all contained overall dimensions.

Finally, it is clear that modifications and variations can be made to the synchronization and engagement device 1 described herein with reference to the attached plate of drawings, without thereby departing from the scope of protection of the present invention, as defined in the annexed claims.

In particular, a different number of sectors 54, a different number of small blocks 65, and/or a different number of teeth 58 and of corresponding seats 60 could be provided.

In addition, the members 54 could have a different shape, and/or be just partially housed in the seats 23, and/or the small blocks 65 could be arranged in a position different from what is described above; moreover, the conical surfaces 47 could be carried by the rings 44 instead of by the gears.

Furthermore, the bushing 18 could be defined by a portion of the shaft 3, instead of being a distinct piece; and/or the device 1 could be used for engaging even just a single gear.

The invention claimed is:

1. A device (1) for synchronization and engagement of a gear transmission of a motor vehicle comprising a shaft (3) and at least one idle gear (9) coaxial with respect to said shaft; the device comprising:

a cylindrical hollow portion (18) designed to be coaxial and in a fixed position with respect to said shaft;

a driving ring (44), designed to be fixed to said gear and comprising a first toothing (46);

a first conical friction surface (47), carried by one between said driving ring (44) and said gear (9);

a floating synchronizing ring (39), set between said cylindrical hollow portion (18) and said driving ring (44) and comprising:
  a) a second conical friction surface (40) mating with said first conical friction surface (47); and
  b) a second toothing (41); and at least one engagement member (54), which is angularly fixed with respect to said cylindrical hollow portion (18), is able to slide axially under the action of a control device (16, 16a), and has a cylindrical toothing (55) designed to mesh progressively with said second toothing (41) and with said first toothing (46) to render said cylindrical hollow portion (18) angularly fixed (17) with said driving ring (44); an inner portion of said engagement member (54) being actuated by said control device (16, 16a) and being located in a radial position that is more internal with respect to that of said toothings (41, 46, 55);

said device being characterized in that said toothings (41, 46, 55) are located in a radial position that is more internal with respect to that of said conical friction surfaces (40, 47).

2. The device according to claim 1, characterized in that:
said engagement member (54) is located completely in a radial position that is more internal with respect to that of said toothings (41, 46, 55);
  said first and second toothings (41, 46) are internal toothings;
the cylindrical toothing (55) of said engagement member (54) is an external toothing;
said second conical friction surface (40) faces radially the outside of said synchronizing ring (39).

3. The device according to claim 1, characterized in that said cylindrical hollow portion (18) has a guide seat (23) that guides the axial translation of said engagement member (54).

4. The device according to claim 3, characterized by comprising a plurality of said engagement members (54) angularly located at a distance with respect to one another about the axis of said cylindrical hollow portion (18), and in that said cylindrical hollow portion (18) has a corresponding guide seat (23) for each said engagement member (54).

5. The device according to claim 4, characterized in that said engagement members (54) have the shape of a cylindrical sector and are completely housed in the respective guide seats (23).

6. The device according to claim 3, characterized in that said guide seat (23) passes radially through said cylindrical hollow portion (18).

7. The device according to claim 3, characterized in that said cylindrical hollow portion (18) has an outer cylindrical surface (27); an internal cylindrical surface of said gear (9) being coupled to said outer cylindrical surface (27) in a rotatable manner.

8. The device according to claim 7, characterized by comprising an outer ring gear (29) fitted in a coaxial and fixed position on said cylindrical hollow portion (18); said driving and synchronizing rings (44, 39) being housed in an annular chamber (50) defined by said cylindrical hollow portion (18), by said outer ring gear (29) and by said gear (9).

9. The device according to claim 8, characterized by comprising angular-constraint means (57) located axially between a face (31) of said outer ring gear (29) and said synchronizing ring (39) to limit the angular fluctuation of said synchronizing ring (39) with respect to said engagement member (54).

10. The device according to claim 9, characterized in that said angular-constraint means (57) comprise:
  at least one axial tooth (58) fixed to said synchronizing ring (39); and
  at least one retention seat (60) made on said face (31), which has a larger size than said axial tooth (58) in a circumferential direction and is engaged slidably in a circumferential direction by said axial tooth (58).

11. The device according to claim 8, characterized in that said outer ring gear (29) has an internal radial surface comprising a cylindrical portion (61) coupled to said cylindrical hollow portion (18) and a toothed portion (62) coupled to said cylindrical toothing (55) in such a way that it is able to slide axially.

12. The device according to claim 8, characterized by comprising:
  at least one pre-synchronization block (65), which faces axially said synchronizing ring (39) and is coupled in such a way that it is able to slide axially and is angularly fixed to said engagement member (54);
  axial retention means (67), which are located between said block (65) and said engagement member (54) and comprise elastic means (68) to maintain said engagement member (54) and said pre-synchronization block (65) axially fixed with respect to one another during a portion of axial pre-synchronization travel, in which said pre-synchronization block (65) pushes said synchronizing ring (39) axially to bring said second conical friction surface (40) into engagement with said first conical friction surface (47); said axial retention means (67) being releasable when the axial path of said engagement member (54) continues beyond said portion of axial pre-synchronization travel.

13. The device according to claim 12, characterized in that said pre-synchronization block (65) is located radially between said engagement member (54) and said outer ring gear (29); said outer ring gear (29) having a groove (71) axially guiding a portion (72) of said pre-synchronization block (65).

14. The device according to claim 13, characterized in that said axial retention means (67) comprise:
  a pin (73) that can slide radially in a guide cavity (74), which is made in said engagement member (54) and houses said elastic means (68); and
  a retention seat (75) made in said pre-synchronization block (65).

15. The device according to claim 13, characterized in that said pre-synchronization block (65) has an axial length equal to that of said engagement member (54) and comprises two axial ends (79) and an intermediate portion (72) that projects radially outwards with respect to said axial end (79) to engage said axial guide groove (71).

16. The device according to claim 15, characterized in that said synchronizing ring (39) comprises:
  a first annular portion (59), which surrounds one said axial end (79) and faces axially said intermediate portion (72); and
  a second annular portion (69), which is located axially alongside the first annular portion (59) and carries said second toothing (41).

17. The device according to claim 16, characterized in that said second toothing (41) is discontinuous and extends in a corresponding axial position of said engagement member (54).

18. A gear transmission (2) for a vehicle, comprising a synchronization and engagement device (1) according to claim 1, and a control device (16a) comprising: at least one linear actuator (140) comprising a liner (141), which is at least partially housed in said shaft (3); and at least one stem (103, 103b), which is coupled to said engagement member (54) and is axially movable for axial translation of the engagement member (54).

19. A gear transmission (2) for a vehicle, comprising a synchronization and engagement device (1) according to claim 1, and a control device (16, 16a) comprising:
  a control pin (101), which is fixed with respect to said engagement member (54) and extends radially inwards with respect to said engagement member (54); and
  a stem (103, 103a, 103b), which is coupled to said control pin (101), at least partially housed in the shaft (3), and is actuated for axial translation of said engagement member (54);
said shaft (3) having a radial hole (25), which is traversed by said control pin (101) and has dimensions such as to enable axial translation of said control pin (101).

20. The gear transmission according to claim 19, characterized in that said stem (103) extends along the axis (5) of said shaft (3), and by comprising a cross journal (104) carrying a plurality of said control pins (101), each associated to a corresponding engagement member (54); said cross journal (104) being coupled to one end of said stem (103) by means of a bearing.

21. The gear transmission according to claim 19, characterized in that said stem (103a) is parallel and located at a distance from the axis (4) of said shaft (3), and by comprising a supporting ring (107), which is traversed by a further stem (103) and carries a plurality of said control pins (101), each associated to a corresponding engagement member (54); said supporting ring (107) having a circular track coupled to one end of said stem (103a) by means of a bearing.

* * * * *